(12) United States Patent
Murayama et al.

(10) Patent No.: US 6,470,746 B1
(45) Date of Patent: Oct. 29, 2002

US006470746B1

(54) ACCELERATION SENSOR

(75) Inventors: Yasunori Murayama, Aichi-ken (JP); Tomonori Nagata, Aichi-ken (JP); Keiichi Kato, Aichi-ken (JP); Tatsuo Yamashita, Aichi-ken (JP); Seiji Hori, Aichi-ken (JP); Keisuke Imai, Aichi-ken (JP); Yoshio Umezawa, Aichi-ken (JP)

(73) Assignee: Kabushiki Kaish Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/701,677

(22) PCT Filed: Jul. 21, 1999

(86) PCT No.: PCT/JP99/03891

§ 371 (c)(1),
(2), (4) Date: Nov. 29, 2000

(87) PCT Pub. No.: WO00/07027

PCT Pub. Date: Feb. 10, 2000

(30) Foreign Application Priority Data

Jul. 28, 1998 (JP) ............................................ 10-213066

(51) Int. Cl.⁷ ............................. G01P 1/02; A62B 35/00
(52) U.S. Cl. ........................................ 73/493; 297/480
(58) Field of Search ................ 73/493, 488; 280/801.1; 297/474, 475, 476, 478, 479, 480, 468, 469

(56) References Cited

FOREIGN PATENT DOCUMENTS

| EP | 0 351 551 A2 | 1/1990 |
|----|--------------|--------|
| JP | 1-202553 | 8/1989 |
| JP | 11-180252 | 7/1999 |

*Primary Examiner*—Richard A. Moller
(74) *Attorney, Agent, or Firm*—Knobbe Martens Olson & Bear LLP

(57) ABSTRACT

An object of the present invention is to obtain an acceleration sensor that can reliably detect acceleration when inclination of an inclining member is within a fixed range, and that can reduce unnecessary movement of relevant members when inclination of the inclining member is outside of the range, so that space efficiency in an inner portion is high. In the present invention, a gear of a fixed gear fixed at a seat cushion is formed in only a portion in the circumferential direction, and a portion at which the gear is not formed is a sliding surface. One of teeth among a plurality of teeth of a pinion of a revolving gear is short, to form a notched tooth portion. In a state in which the forward-collapsed angle of a seatback exceeds a predetermined angle, the notched tooth portion faces the sliding surface and the revolving gear body no longer rotates. At this time, since a bracket at which a sensor ball is mounted also does not rotate, the bracket is held at a fixed position relative to a frame plate. Accordingly, a space formed in frame plates in consideration of rotation of the bracket does not need to be large, and space efficiency is high.

19 Claims, 12 Drawing Sheets

F I G. 4
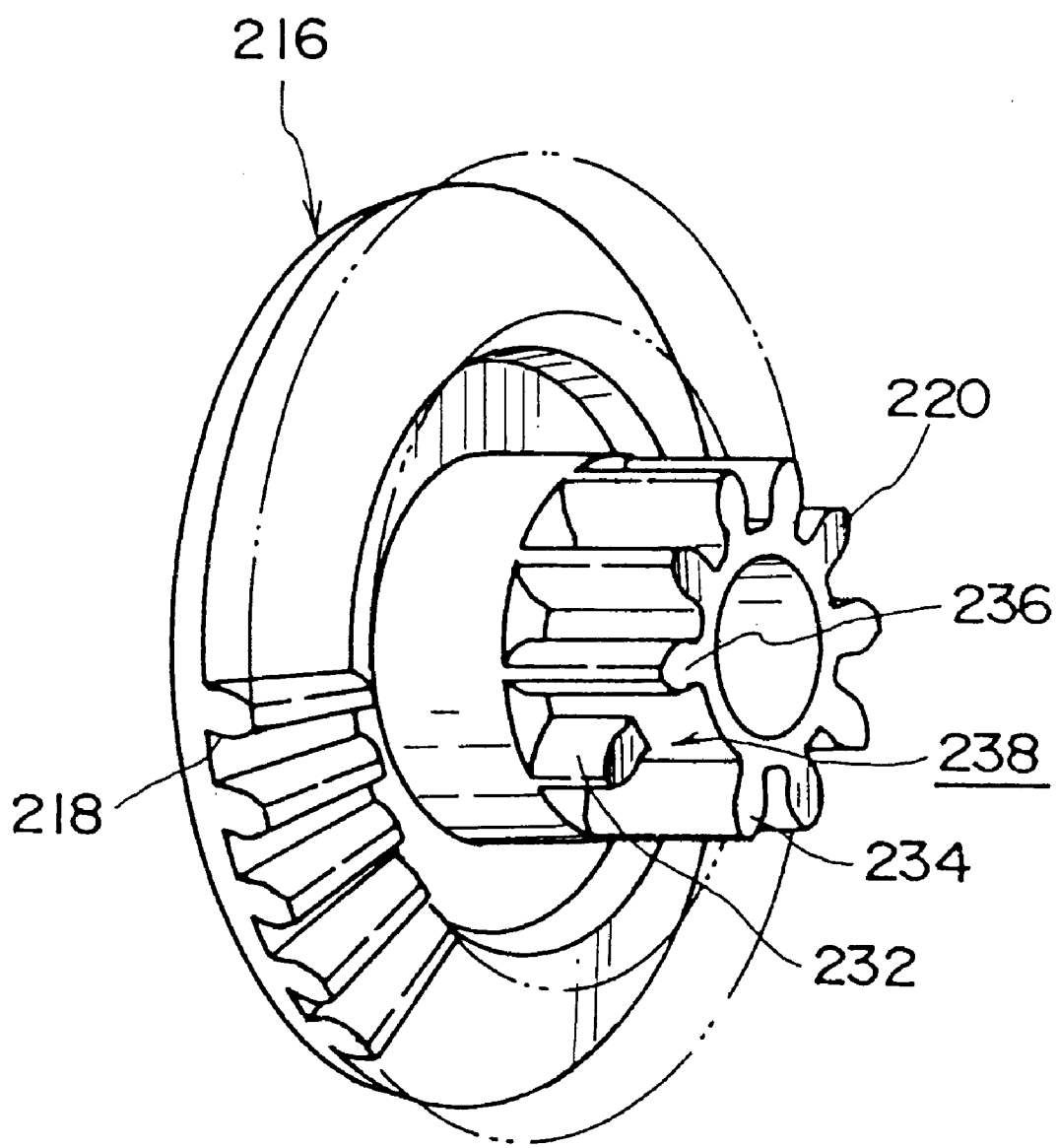

F I G. 7 A
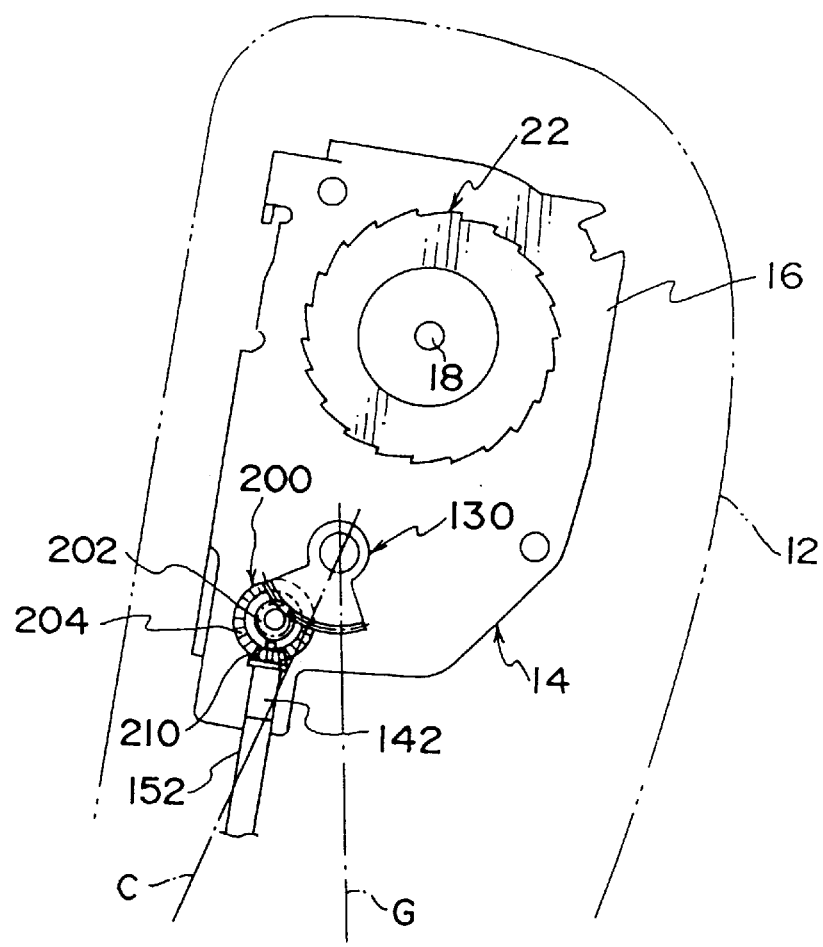
F I G. 7 B
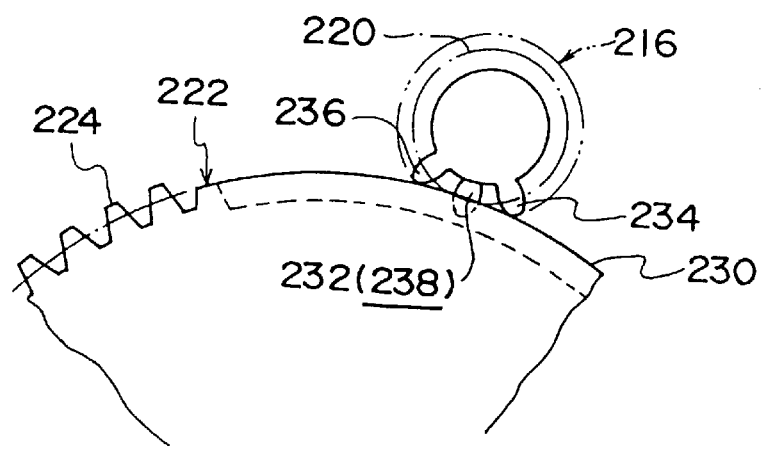

F I G. 1 0
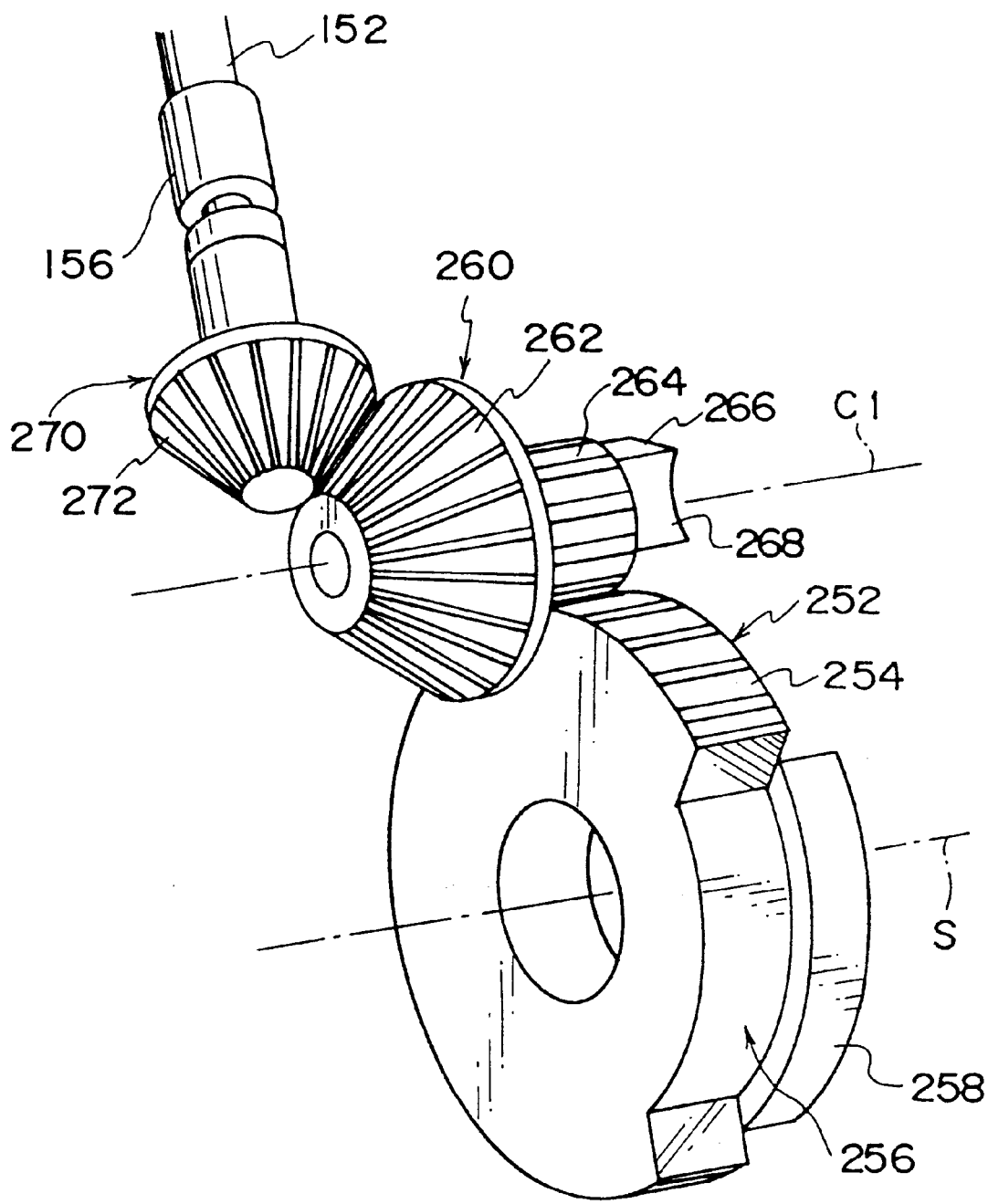

F I G. 1 1
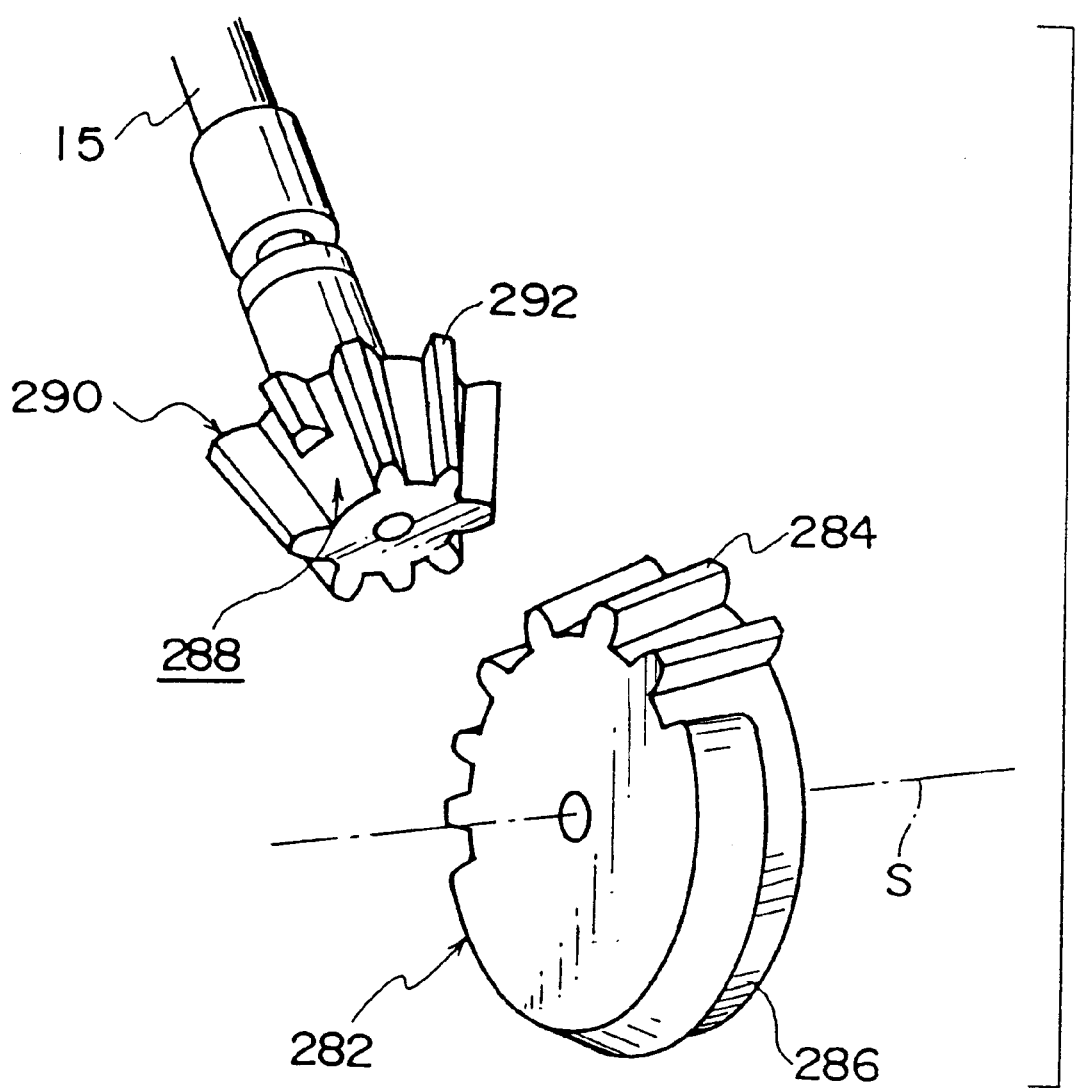

ACCELERATION SENSOR

TECHNICAL FIELD

The present invention relates to an acceleration sensor, and more particularly, relates to an acceleration sensor attached to an inclining member such as a seatback or the like of a vehicle, which sensor is not affected by inclination of this inclining member in detecting acceleration of the vehicle.

BACKGROUND ART

In some acceleration sensors for detecting acceleration of a vehicle or the like, a sensor ball (moving body) of a fixed mass is mounted on a supporting surface of a supporting body of a bracket or the like. The sensor ball, when receiving an acceleration larger than or equal to a predetermined value, drives an output member by being inertially moved by the acceleration.

For cases where this type of acceleration sensor is attached to a member that inclines such as a seatback of a vehicle or the like, there is a type of acceleration sensor (what is known as an interlock follow-up system), in which a portion of a seat of a vehicle and a bracket are connected by a connecting member such as a wire, and when the seatback inclines, this bracket is forcibly rotated by the connecting member so as to maintain a supporting surface of the bracket at a predetermined angle. This interlock follow-up system acceleration sensor can detect a predetermined acceleration even when a seatback is in a reclining posture.

However, when the angle of inclination of the inclining member exceeds a certain range, there are cases in which it is no longer necessary to detect the acceleration with the acceleration sensor (for example, a state in which a seatback is collapsed forward, in a case of an acceleration sensor attached to a seatback of a vehicle, or the like). However, if the supporting body is made to interlock with the inclining member in a simple manner, even when the angle of inclination of the inclining member exceeds this certain range, the supporting body rotates with respect to the inclining member at the same angle as the angle of inclination of the inclining member. As a result, a predetermined space must be provided at the inclining member in consideration of this rotational path, which lowers space efficiency.

DISCLOSURE OF THE INVENTION

In consideration of the aforementioned circumstances, the present invention has as an object obtaining an acceleration sensor that can detect reliably acceleration when inclination of an inclining member is in a fixed range, and whose space usage efficiency within a device is high.

In order to achieve the above-described object, in a first aspect of the present invention, an acceleration sensor comprises: a supporting body attached to an inclinable inclining member so as to be rotatable at least about an axis parallel with an inclination center of the inclining member; a moving body supported at the supporting body, for driving an output member by being inertially moved by an acceleration of a predetermined value or more; angle maintaining means for interlocking with inclination of the inclining member to maintain the supporting body at a fixed angle with respect to the horizontal plane; and interlock prevention means for, when the inclining member inclines exceeding a predetermined angle of inclination, preventing interlock of the angle maintaining means with respect to the inclining member and fixedly maintaining a relative position of the angle maintaining means with respect to the inclining member.

According to this first aspect, when the inclining member inclines exceeding a predetermined angle of inclination, interlock of the angle maintaining means with respect to the inclining member is prevented by the interlock prevention means, and the relative position of the angle maintaining means with respect to the inclining member is fixedly maintained. As a result, the angle of the supporting body with respect to the inclining member is fixedly maintained.

Namely, in a state in which the angle of inclination of the inclining member exceeds a predetermined angle of inclination, the supporting body does not rotate with respect to the inclining member, and therefore a space does not need to be provided in light of this rotation, and space efficiency inside the device becomes high. Further, since a phase difference (a difference in relative positions) is not generated between the angle maintaining means and the inclining member, deviation is not generated in the angle of the supporting body with respect to the inclining member either, and the supporting body is maintained at a fixed angle with respect to the horizontal plane by the angle maintaining means.

Thereafter, when the inclining member is moved in the direction of returning to the original state, the interlock prevention means cancels interlock prevention of the angle maintaining means with respect to the inclining member. As a result, within a range of a predetermined angle of inclination, the supporting body can be maintained at the predetermined angle with respect to the horizontal plane by the angle maintaining means.

In particular, in a state in which the inclining member inclines exceeding the predetermined angle, the interlock prevention means fixedly maintains the relative position of the angle maintaining means with respect to the inclining member. Therefore, when the interlock prevention is canceled by the angle maintaining means, a phase difference is not generated between the angle maintaining means and the inclining member. As a result, deviation does not occur in the angle of the supporting body with respect to the inclining member either, and the supporting body is maintained at a fixed angle with respect to the horizontal plane by the angle maintaining means.

In a second aspect of the present invention, the angle maintaining means comprises: a fixed gear body fixed coaxially with the inclination center of the inclining member; and a revolving gear body attached to the inclining member so as to be able to revolve with respect to the fixed gear body to thereby mesh with the fixed gear body, and the interlock prevention means comprises: a releasing portion for releasing meshing of the fixed gear body and the revolving gear body when the inclining member inclines exceeding a predetermined angle of inclination; and a fixing portion for, when the meshing of the fixed gear body and the revolving gear body is released, fixing the revolving gear body such that relative rotation thereof with respect to the inclining member is impossible.

According to this second aspect, since the releasing portion releases meshing of the fixed gear body and the revolving gear body when the inclining member inclines exceeding the predetermined angle of inclination, rotation (interlock with respect to the inclining member) of the revolving gear body is prevented. Further, in a state in which this meshing is released, the fixing portion fixes the revolving gear body such that the revolving gear body is unable to undergo relative rotation with respect to the inclining member.

As a result, the revolving gear body is maintained at a fixed position relative to the inclining member, and the supporting body is also maintained at a fixed position with respect to the inclining member. When the revolving gear body is returned to a position of meshing with the fixed gear body, a phase difference is not generated between the revolving gear body and the fixed gear body. Deviation does not occur in the angle of the supporting body with respect to the inclining member either, and the supporting body is maintained at the fixed angle with respect to the horizontal plane.

In a third aspect of the present invention, with the invention according to claim 3, in the invention according to claim 1, the angle maintaining means comprises: a rotating body fixed at the supporting body so as to be rotatable about the rotational axis of the supporting body; and rotating means for interlocking with inclination of the inclining member so as to be able to rotate the rotating body in the opposite direction to the inclination direction of the inclining member and at the same angle as the inclination of the inclining member, and the interlock prevention means comprises: an abutting portion for preventing relative rotation of the supporting body with respect to the inclining member by abutting the supporting body when the inclining member exceeds a predetermined angle; and allowing means for, in a state in which the abutting portion has abutted the supporting body, allowing the rotating means to rotate relatively to the rotating body.

Namely, when the inclining member is inclined, the rotating means interlocks with this inclination and rotates the rotating body in the opposite direction to the inclination direction of the inclining member and at the same angle as the inclination of the inclining member. As a result, the supporting body also rotates, and the supporting body is maintained at the predetermined angle with respect to the horizontal plane.

According to this third aspect, since the abutting portion abuts the supporting body and thus prevents relative rotation of the supporting body with respect to the inclining member when the inclining member inclines exceeding the predetermined angle of rotation, interlocking of the supporting body with respect to the inclining member is prevented. Further, in a state in which the abutting portion abuts the supporting body, the allowing means allows the rotating means to rotate relatively with respect to the rotating body. As a result, the rotating means becomes independent from the rotating body in correspondence with the angle of inclination of the inclining member, to interlock with the inclining member and rotate. Accordingly, when the supporting body separates from the abutting portion and becomes able to undergo relative rotation with respect to the inclining member, a phase difference is not generated between the rotation means and the rotating body. Deviation in the angle of the supporting body with respect to the inclining member is not generated either, and the supporting body is maintained at a fixed angle with respect to the horizontal surface.

BRIEF DESCRIPTION OF THE DRAWINGS

FIG. 4 is a perspective view showing a revolving gear of the acceleration sensor relating to the first embodiment of the present invention.

FIG. 7A is a side view schematically showing a retractor having the acceleration sensor relating to the first embodiment of the present invention attached thereto, when the seat for an automobile is collapsed forward.

FIG.7B is a side view schematically showing meshing of the fixed gear and the revolving gear when the seat for an automobile is in a forward-collapsed state.

FIG. 10 is a perspective view showing the vicinity of a rotational center of a seat for an automobile in which a retractor having an acceleration sensor relating to a second embodiment of the present invention attached thereto is applied.

FIG. 11 is an exploded perspective view showing the vicinity of a rotational center of a seat for an automobile in which a retractor having an acceleration sensor relating to a third embodiment of the present invention attached thereto is applied.

BEST MODES FOR IMPLEMENTING THE INVENTION

Figure 1:
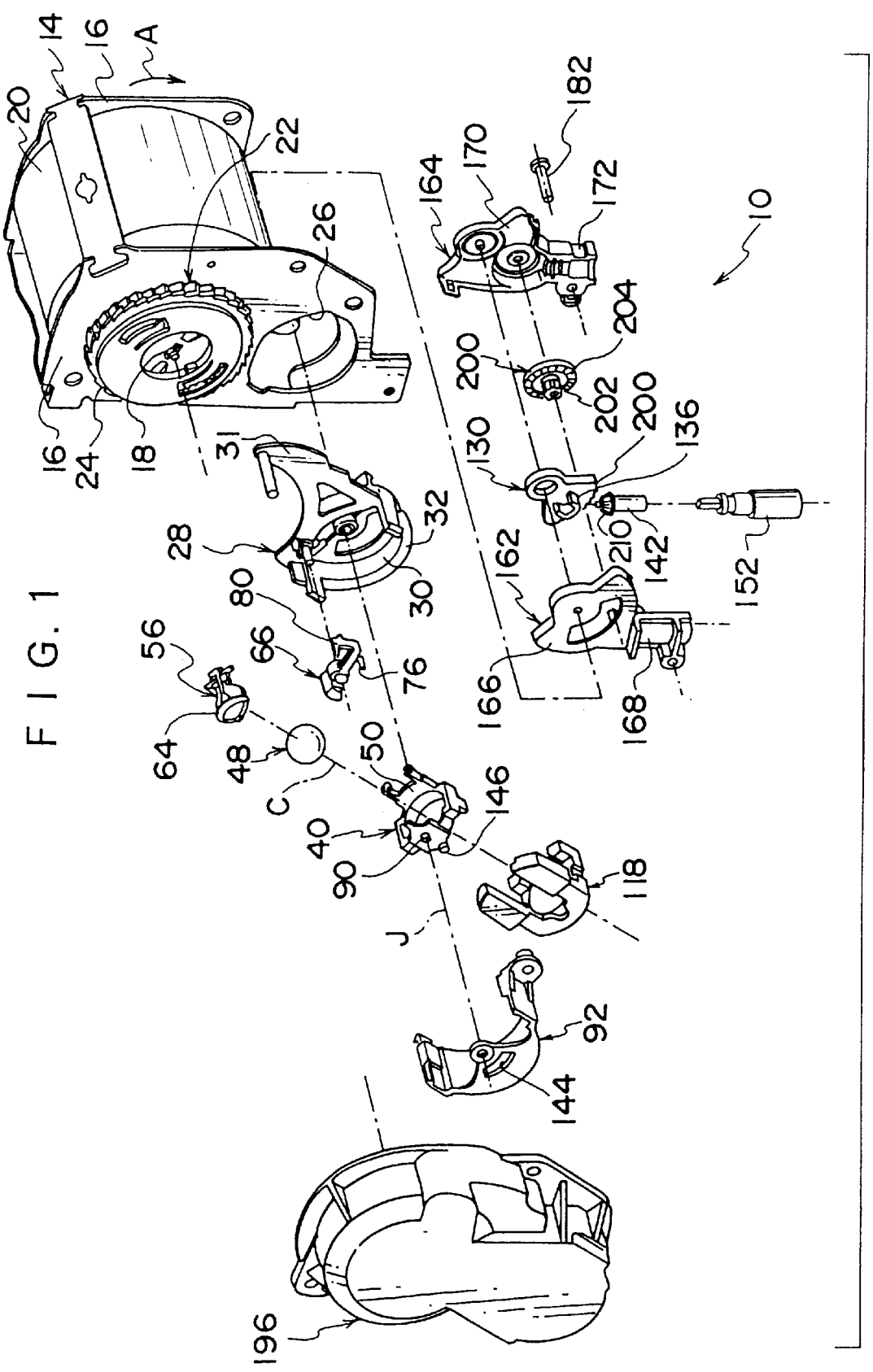
FIG. 1 is an exploded perspective view showing a portion of a retractor attached to an acceleration sensor relating to a first embodiment of the present invention.
Figure 2:
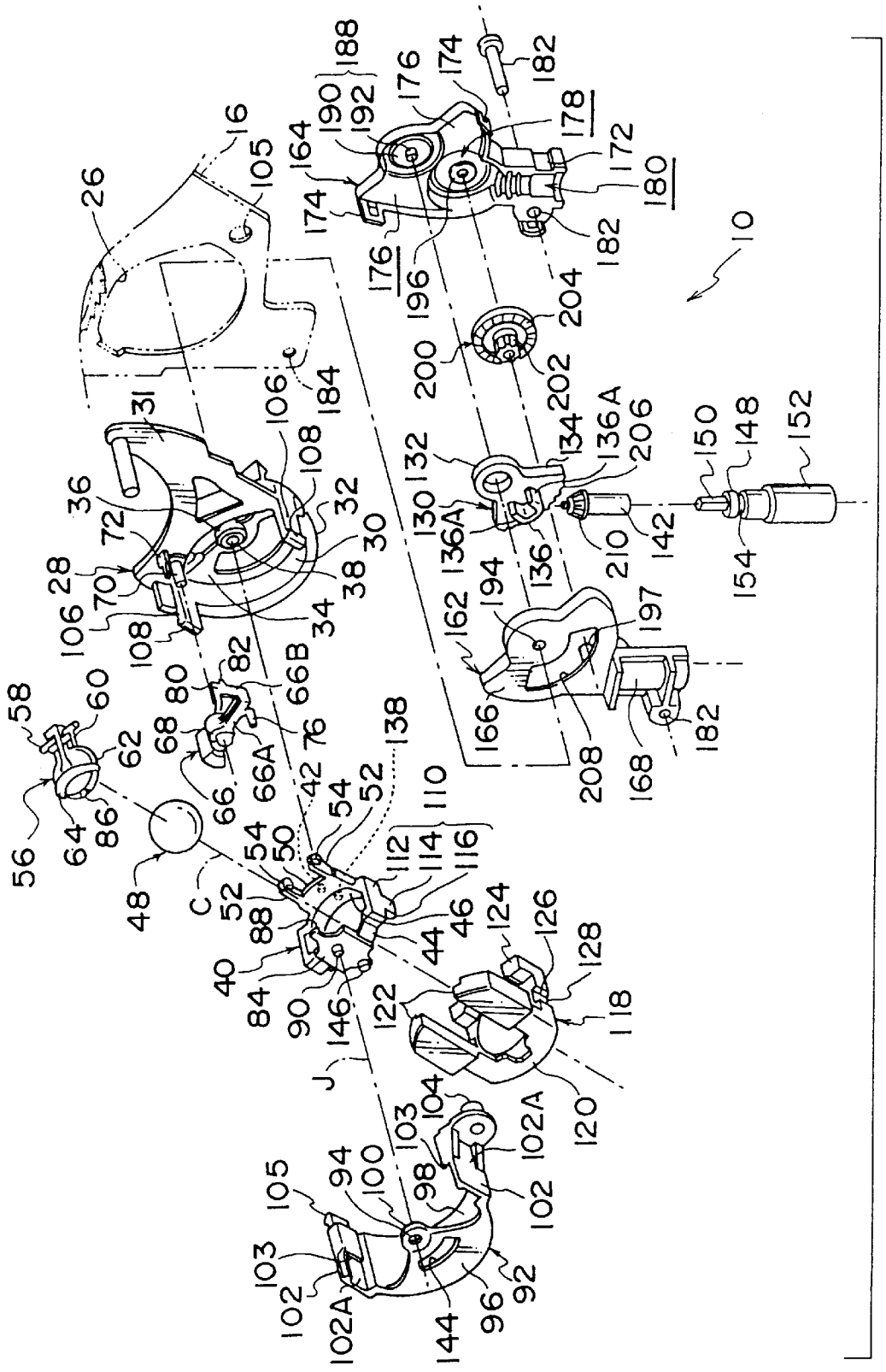
FIG. 2 is an exploded perspective view showing a portion of the acceleration sensor relating to the first embodiment of the present invention.
Figure 3:
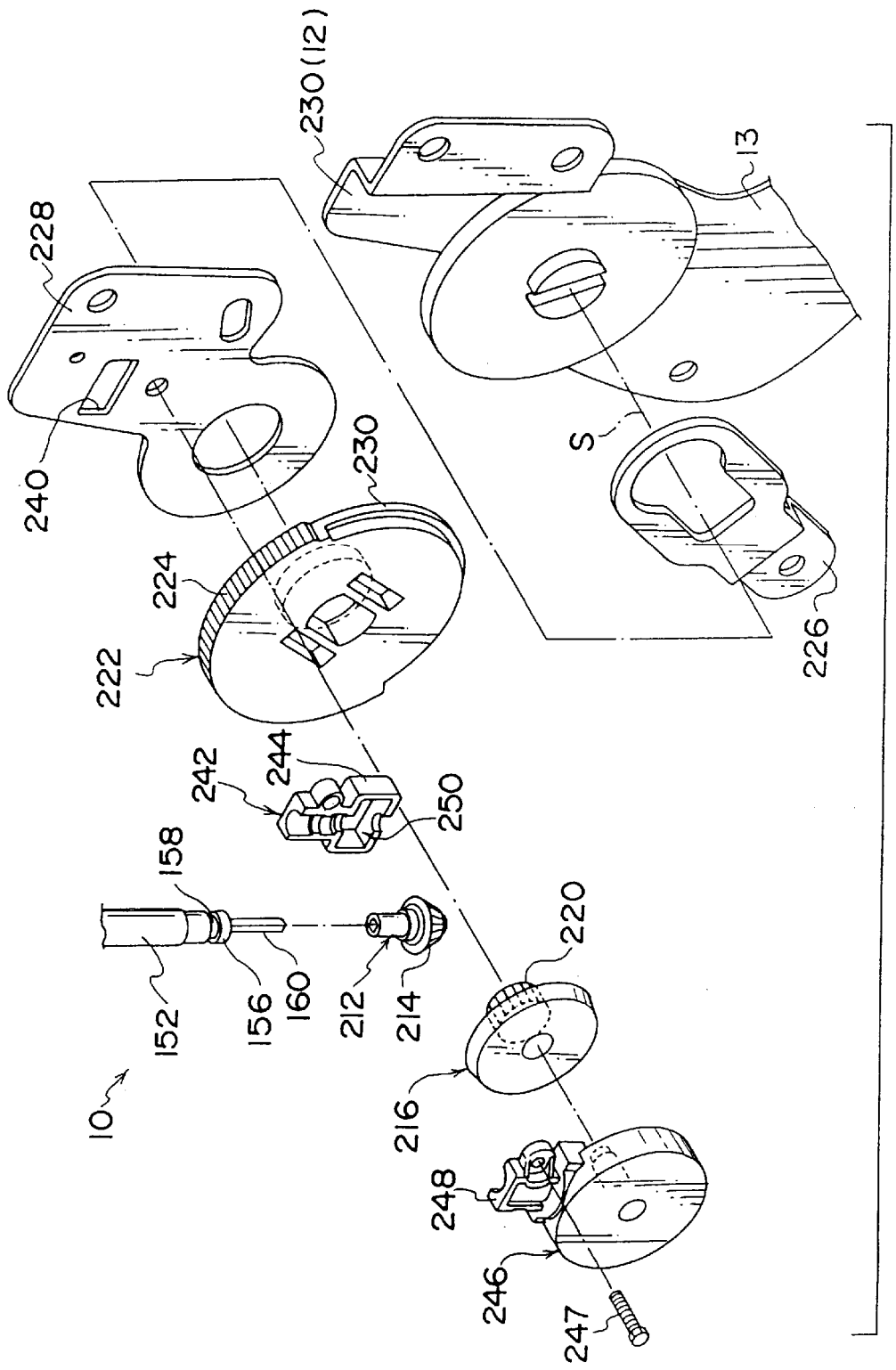
FIG. 3 is an exploded perspective view showing a vicinity of a rotational center of a seat for an automobile, to which is applied the retractor having the acceleration sensor relating to the first embodiment of the present invention attached thereto.

In FIGS. 1 and 3, an acceleration sensor 10 according to a first embodiment as the best mode for implementing the present invention is shown in a state in which the acceleration sensor 10 is used as an acceleration sensor of a seat belt device for an automobile. Further, in FIG. 2, a main portion of this acceleration sensor 10 is shown in an enlarged view.

Figure 5A:
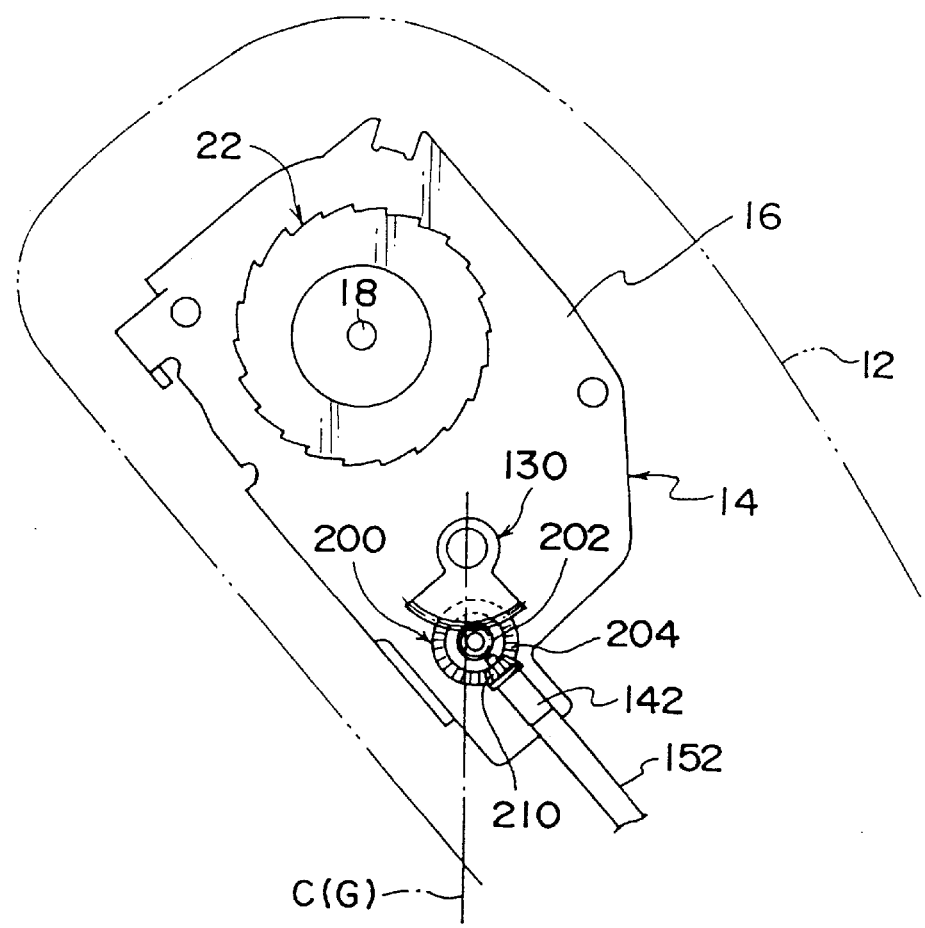
FIG. 5A is a side view schematically showing the retractor having the acceleration sensor relating to the first embodiment of the present invention attached thereto, when the seat for an automobile is at a predetermined reclining angle.

As shown in FIG. 5A, a retractor 14 of the seatbelt device is attached to a seatback 12 for inside an automobile. As shown in FIG. 1, a spool shaft 18 is hung and axially supported, so as to be rotatable, between a pair of parallel frame plates 16 structuring the retractor 14. A substantially cylindrical spool (not shown in the Figure) for taking up a webbing 20 (see FIG. 5) is mounted in the spool shaft 18.

One end of the spool shaft 18 protrudes out from the frame plate 16, and a ratchet wheel 22 is attached to this protruding portion. The ratchet wheel 22, the spool shaft 18 and a spool rotate integrally. A latching pawl 80 of a pawl 66 to be described later engages with ratchet teeth 24 of the ratchet wheel 22. Accordingly, rotation via the ratchet wheel 22 and the spool shaft 18 in the direction in which the webbing 20 of the spool is pulled out (direction of arrow A) is prevented. However, in a state in which the latching pawl 80 is engaged, if the spool attempts to rotate in the direction in which the webbing 20 is taken up (direction opposite to arrow A), rotation of the ratchet wheel 22 is not prevented, since the latching pawl 80 rides on the ratchet teeth 24. As a result, the spool can rotate in the webbing 20 take-up direction.

As shown in FIGS. 1 and 2, a mounting hole 26 is formed in a lower portion of one of the frame plates 16, and a sensor cover 28 is fitted into this mounting hole 26.

As shown in FIG. 2, the sensor cover 28 is structured by the mounting hole 26 substantially in a form of a cylinder having a bottom, a pipe portion 30 having substantially the same form, and a shaft plate portion 31 protruding in a substantially triangular form towards diagonally above the pipe portion 30. A flange 32 is provided in an upright position from a periphery of an opening of the pipe portion 30, and the position of the sensor cover 28 is determined by this flange 32 contacting the frame plate 16.

A shaft supporting pipe 36 is provided upright and integrally with a bottom plate 34, from the center of the bottom plate 34 of the sensor cover 28 towards the opening. A shaft pin 42 provided so as to protrude from the bracket 40 is inserted into a shaft hole 38 in a center of the shaft supporting pipe 36. This shaft pin 42 forms a rotational center (center line J) of the bracket 40.

The bracket 40 is formed with synthetic resin, and has a supporting portion 44 in a flattened reverse conical form (center line of the supporting portion 44 is indicated by C). An upper surface of the supporting portion 44 is a supporting surface 46, which inclines downward from an outer periphery towards the center. A metal sensor ball 48 is mounted on this supporting surface 46 and is supported. The supporting surface 46 is ordinarily in a direction in which the center line C coincides with a vertical line G (see FIGS. 5A and 8). Accordingly, the sensor ball 48 makes linear contact with the supporting surface 46 in a circular form with the center line C as the center.

A shaft plate 50 is provided so as to protrude from a side end portion of the sensor cover 28 towards the upper side, and the shaft pin 42 to be inserted into the shaft hole 38 is provided so as to protrude from the center of the shaft plate 50.

A shaft column 52 having a height higher than that of the shaft plate 50 is provided at both sides of the shaft plate 50 so as to protrude therefrom. At an upper portion of the shaft column 52, a shaft receiving hole 54, which passes completely through the shaft column 52, is formed in the transverse direction of the shaft plate 50. A support shaft 58 of the sensor lever 56 is inserted into the shaft receiving holes 54.

The sensor lever 56 is integrally formed with an arm 60 extended from the center of the support shaft 58 in a direction orthogonal to this support shaft 58, and a reverse funnel-shaped holding plate 62 formed in a substantially conical form at the distal end portion of the arm 60. The holding plate 62 is placed on an upper surface of the sensor ball 48.

Figure 9:
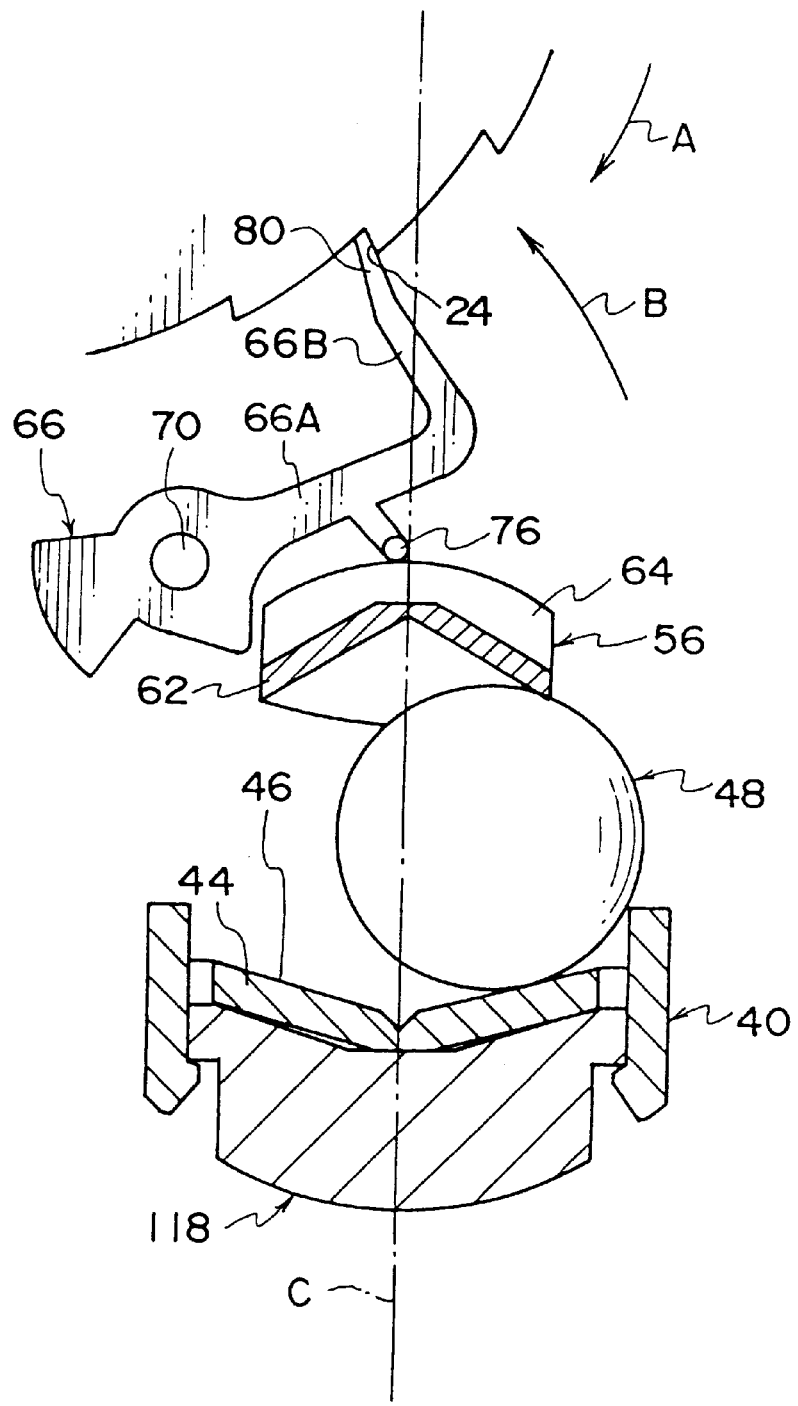
FIG. 9 is a side view schematically showing a state in which the latching pawl of the acceleration sensor relating to the first embodiment of the present invention is engaged with the ratchet wheel of the retractor.

Then, when an acceleration rate larger than or equal to a certain value occurs in a vehicle, as shown in FIG. 9, the sensor ball 48 rolls on the supporting surface 46 due to inertia and moves towards an upper side of the supporting surface 46, pushing the holding plate 62 upward. As a result, the sensor lever 56 rotates towards the direction separating the holding plate from the supporting surface 46, with the support shaft 58 as a rotational center.

An operation protrusion 64 for operating the pawl 66 is provided so as to protrude from an upper surface of the holding plate 62.

Figure 8:
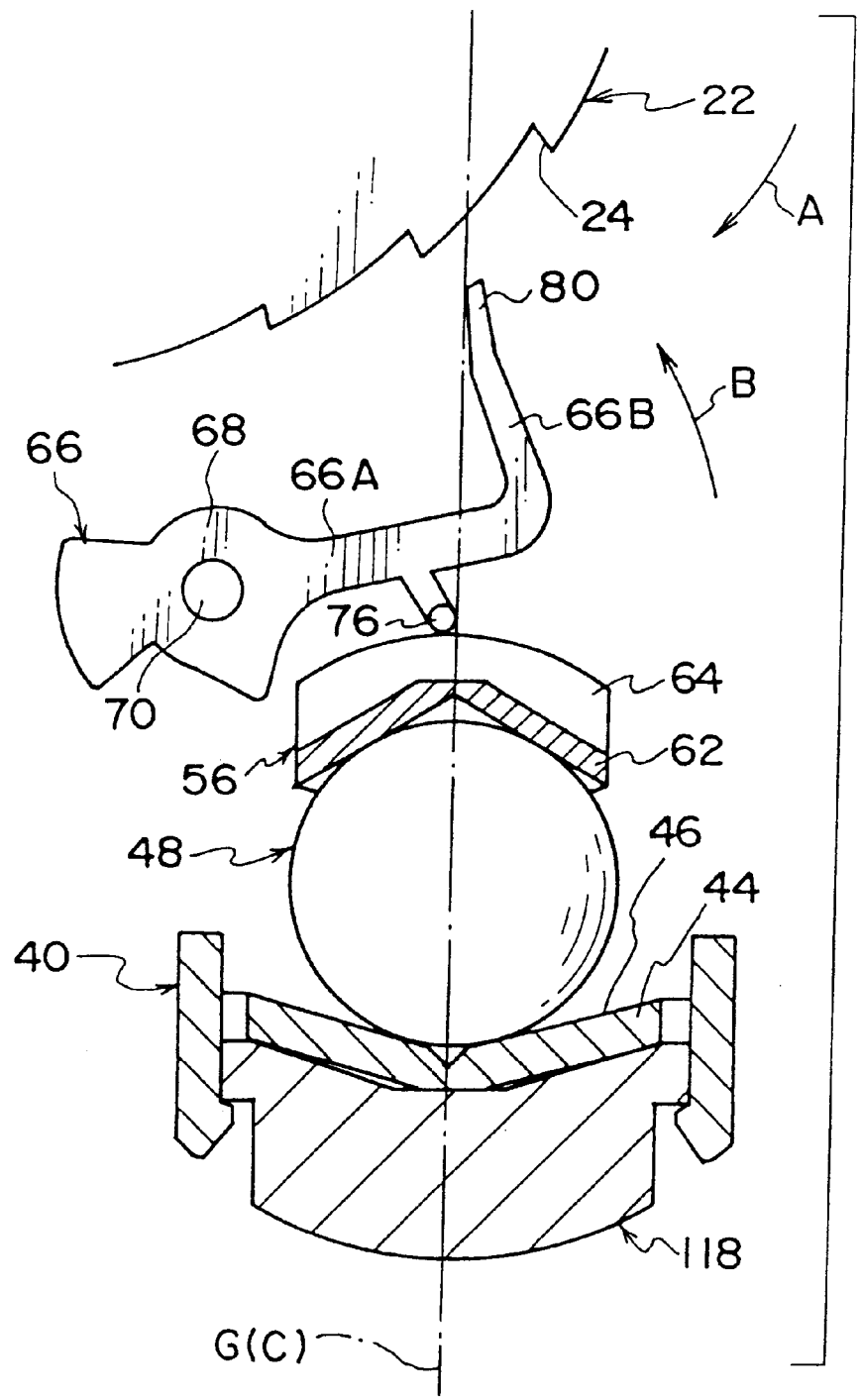
FIG. 8 is a side view schematically showing a state in which a latching pawl of the acceleration sensor relating to the first embodiment of the present invention is separated from a ratchet wheel of the retractor.

The pawl 66, as shown in FIGS. 2, 8 and 9, is formed in a substantially L-shaped form when seen from the side. A support shaft 70 provided so as to protrude from the sensor cover 28 is inserted through an inner portion of a pipe portion 68 formed in a long piece portion 66A. Accordingly, the pawl 66 is axially supported at the sensor cover 28 so as to be rotatable with the support shaft 70 as the center.

Further, as shown in FIG. 2, a control plate 72 is provided so as to protrude from the flange 32, and due to the control plate 72 abutting against the long piece portion 66A of the pawl 66, rotation of the pawl 66 is controlled to within a certain range.

A receiving member 76 is provided so as to protrude substantially from a center of the long piece portion 66A of the pawl 66 towards the sensor lever 56. The receiving member 76 contacts an upper end of the operation protrusion 64 of the sensor lever 56 due to the weight of the pawl 66.

As shown in FIG. 2, the latching pawl 80 is formed at a distal end of a short piece portion 66B of the pawl 66, so as to extend towards the receiving member 76 side (in FIG. 8, the near side of the paper surface) and become gradually thinner towards the distal end of the short piece portion 66B. As shown in FIG. 9, when the pawl 66 rotates in the counter-clockwise direction (direction of arrow B), the latching pawl 80 engages with the ratchet teeth 24 of the ratchet wheel 22, rotation of the pawl 66 in the counter-clockwise direction is prevented, and rotation of the ratchet wheel 22 in the clockwise direction of FIG. 8 (direction of arrow A) is prevented.

On the other hand, as shown in FIG. 8, when the pawl 66 rotates in the clockwise direction (direction opposite to arrow B), the latching pawl 80 separates from the ratchet teeth 24 of the ratchet wheel 22. Accordingly, the ratchet wheel 22 can then rotate in either the clockwise direction (direction of arrow A) or the counter-clockwise direction, in FIG. 8.

A control protrusion 82 is provided so as to protrude from substantially a center of the short piece portion 66B of the pawl 66, towards the direction opposite the direction in which the latching pawl 80 protrudes. This control protrusion 82 contacts a rim of the sensor cover 28, and rotation of the pawl 66 in the clockwise direction of FIG. 4 (direction opposite that of arrow B) is controlled.

A shaft plate 84 is provided upright at a position on the bracket 40 opposing the shaft plate 50 with respect to the central line C of the supporting portion 44. The shaft plate 84 is formed so as to become gradually more pointed from substantially the center in the vertical direction towards the top end. A control pawl 88 extending towards the shaft plate 50 is formed at the top end of the shaft plate 84. Rotation of the sensor lever 56 in the direction (downward) in which the holding plate 62 approaches the supporting portion 44 is controlled by a control protrusion 86, which is formed at a distal end of the holding plate 62, contacting the control pawl 88.

A support shaft 90 is provided so as to protrude from substantially the center of the shaft plate 84 towards the side opposite the shaft plate 50, coaxially with the shaft pin 42 (namely, along the axial line J). The support shaft 90 is inserted into a shaft hole 94 formed in a hanger 92. As a result, the shaft pin 42 is inserted into the shaft hole 38 in the sensor cover 28, the support shaft 90 is inserted into the shaft hole 94 of the hanger 92, and the bracket 40 is made rotatable about axial line J.

The hanger 92 has a front plate portion 96 in a substantially fanshaped form when seen in a front view, and a peripheral plate portion 98 in a substantially half-cylinder form extending orthogonally from a rim of this front plate portion 96. A ring portion 100 in a toroidal shape is formed at the center of the front plate portion 96, and a hole in the center of the ring portion 100 is the shaft hole 94. Further, a space surrounded by the front plate portion 96 and the peripheral plate portion 98 is an accommodation space for accommodating the bracket 40.

A control hole 144 is formed in an arc shape in the front plate portion 98, with the shaft hole 94 as the center. A control pin 146 provided so as to protrude from the shaft plate 84 of the bracket 40 is received in the control hole 144. Rotation of the bracket 40 is controlled to within a fixed range by the control pin 146 contacting an end portion of the control hole 144.

A pair of attachment plates 102 are formed at both ends of the peripheral plate portion 98, respectively, so as to face each other in parallel. A latching tier portion 103 is formed at the attachment plate 102. The hanger 92 is attached to the sensor cover 28 by latching the latching tier portion 103 to a mooring portion 108 of a protruding piece 106, which is provided so as to protrude from the sensor cover 28. Further, an engaging pawl 105 is formed in the attachment plate 102. The hanger 92 is attached integrally with the sensor cover 28 to the frame plate 16 by engaging the engaging pawl 105 to a recessed engagement portion 107 of the frame plate 16. Further, a fixing pin 104 is provided so as to protrude from the attachment plate 102. The fixing pin 104 is passed through a passage hole 105 formed in the frame plate 16 of the retractor 14, fixing the hanger 92 to the frame plate 16, and preventing inadvertent rotation or shaking.

A weight attachment portion 110 is integrally provided at each of both end portions of the bracket 40 in the diametrical direction orthogonal to the axial line J (in FIG. 2, only one of the weight attachment portions 110 is illustrated, and the other weight attachment portion 110 is not shown). The weight attachment portions 110 are formed with: rectangular platform-shaped platform portions 112 integrally provided so as to protrude from both side portions, respectively, of the supporting portion 44; and tongue-piece shaped attachment pieces 114 integrally provided so as to protrude downward from a central portion of outer lower sides thereof. Further, an attachment protrusion 116 is integrally formed at a distal end of the attachment piece 114, which attachment protrusion 116 is provided so as to protrude inward in a hook-like form.

A metal weight 118 is integrally attached to the weight attachment portions 110. The weight 118 is integrally formed by: a platform disk portion 120 formed in a substantially half-cylindrical form; a pair of corner pieces 122, each provided upright towards an upper side from an end portion of a side surface of this platform disk portion 120, substantially in parallel with each other; and baby square columnshaped supporting columns 124 provided upright on both corner portions, respectively, of the other side surface of the platform disk portion 120. Further, a pair of attachment grooves 126 are formed correspondingly to the attachment pieces 114 of the bracket 40 by cutting away portions of the disk platform portion 120 in rectangular groove forms. In order to engage the attachment pieces 114 even more reliably in the attachment grooves 126, attachment step portions 128 are formed by removing portions of the attachment grooves 126 in a direction and form corresponding to the attachment protrusions 116, respectively. The attachment pieces 114 are placed in the attachment grooves 126, the attachment step portions 128 are latched on the attachment protrusions 116, and the weight 118 is attached to the bracket 40.

The forms of the bracket 40 and the weight 118 are determined such that the center of gravity of the weight 118 is lower than the rotational center (axial line J) of the bracket 40, and this center of gravity is on the center line C of the supporting portion 44. Accordingly, as shown in FIG. 8, when the bracket 40 rotates about the axial line J with the shaft pin 42 and the support shaft 90 as the center due to the weight of the weight 118, the bracket 40 makes the center line C coincident with the vertical line G.

A holder 162 and a holder cover 164 are disposed on a surface of the frame plates 16 opposite the surface on which the bracket 40, the hanger 92, and the like are disposed.

The holder 162 is structured by: a semi-circular portion 166 in a substantially semi-circular form; and a cylindrical portion 168 in a substantially cylindrical form protruding downward from this semicircular portion 166. Corresponding to the holder 162, the holder cover 164 is structured by a semi-circular portion 170 in a substantially semi-circular form, and a cylindrical portion 172 in a substantially cylindrical form. A latch pawl (not shown) formed on the holder 162 is latched on a latch portion 174 formed on the holder 162, to integrally attach the holder cover 164 to the holder 162. In this state, with the semi-circular portion 166 and the semi-circular portion 170, an accommodation portion 176 in a semi-circular form for accommodating a face wheel 130 and an accommodation portion 178 in a substantially cylindrical form for accommodating a wheel gear 200 is formed. Further, with the cylindrical portion 168 and the cylindrical portion 172, an attachment portion 180 is formed, to which a rotating tube body 142 is rotatably attached.

A pin 186 is passed through a passage hole 182 formed in the holder 162 and the holder cover 164, and the holder 162 and the holder cover 164 are fixed to the frame plates 16 by this pin 186 being further passed through fixing holes 184 formed in the frame plates 16.

At the holder cover 164, a passage pin 188 is formed in a center (coaxial with the axial line J) of the accommodation portion 176. The passage pin 188 is structured by: a large-diameter portion 190 towards the holder cover 164; and a small-diameter portion 192, which is a distal end of this large-diameter portion 190. The large-diameter portion 190 is inserted into a shaft hole of the face wheel 130, and the face wheel 130 is rotatable about the axial line J. Further, the small-diameter portion 192 is inserted into a fixing hole 194 formed in the holder 164 (162), thereby preventing positional deviation of the holder 162 and the holder cover 164.

At the holder cover 164, at the center of the accommodation portion 178 (a position lower than the passage pin 188), a supporting duct 196 is formed. On the other hand, a supporting pin 197 is provided to protrude upright from the holder 162. This supporting pin 197 is inserted into an insertion hole 201 of the wheel gear 200, and is further inserted into the supporting duct 196. As a result, the wheel gear 200 is made rotatable about the supporting pin 197.

The face wheel 130 is formed with: a cylindrically shaped mounting duct portion 132; and a fan portion 134 extended in a fan shape from a portion of the outer periphery of this mounting duct portion 132. An external gear 206 is formed at an outer periphery of the fan portion 134.

A control protrusion 136 in a substantially U-shaped form when seen in a side view is provided upright on the fan portion 134. The control protrusion 136 is received in an arc-shaped long aperture 208 formed in the semi-circular portion 170 of the holder 162, and the face wheel 130 rotates within the range of this long aperture 208. With regards to this, a control shaft 138 to be received in the control protrusion 136 is provided so as to protrude from a position on the bracket 40 facing the fan portion 134. A predetermined clearance is formed between side walls 136A of the control protrusion 136 and the control shaft 138. This clearance is eliminated by rotation of the face wheel 130, and the bracket 40 is thereby rotated.

On the other hand, the wheel gear 200 has a pinion 202, and a bevel gear 204 having a larger diameter than this pinion 202. The pinion 202 meshes with the external gear 206 of the face wheel 130, and when the wheel gear 200 rotates, the face wheel 130 rotates about the axial line J as well.

The bevel gear 204 of the wheel gear 200 meshes with a bevel gear 210 of the rotating tube body 142. This rotating tube body 142 is fixed to an upper end of a wire 152 via a connector 148. When the wire 152 rotates, the rotating tube body 142 rotates via the connector 148, and the wheel gear 200 rotates as well. As a result, the face wheel 130 meshed with the pinion 202 of the wheel gear 200 rotates about the axial line J.

The connector 148 is formed in a substantially cylindrical form, and into an opening (not shown) of a lower end, a square pole-shaped pin 150 formed at an upper end of the wire 152 is inserted. An intermediate portion of the connector 148 is restricted to form a reduced-diameter portion 154. Due to this reduced-diameter portion 154, the core of the wire 152 is compressed from its periphery and becomes integral with the connector 148.

As shown in FIG. 1, at the frame plates 16, an outer cover 198 is attached. The ratchet wheel 22 is received between this outer cover 198 and the frame plates 16. Further, between the outer cover 198 and the sensor cover 28, the pawl 66, the sensor lever 56, the bracket 40, the sensor ball 48, the weight 118 and the hanger 92 are disposed.

As shown in FIG. 3, a connector 156 is attached at a lower end of the wire 152 as well. A substantially central portion in the vertical direction of the connector 156 is restricted, to form a reduced-diameter portion 158. Due to this reduced-diameter portion 158, the core of the wire 152 is compressed from the periphery, to become integral with the connector 156.

A pin 160 protrudes towards a lower side from the connector 156. A distal end of this pin 160 is formed in a square-pole form, in the same way as the pin 150. The pin 160 is inserted into a rotating tube body 212, and rotates integrally with the rotating tube body 212. A bevel gear 214 is formed at a lower end of the rotating tube body 212, and this bevel gear 214 meshes with a bevel gear 218 (see FIG. 4) of a revolving gear 216.

As shown in detail in FIG. 4, the revolving gear 216 has the bevel gear 218, and a bevel gear 220 that has a smaller diameter than this bevel gear 218. The bevel gear 220 meshes with a gear 224 of the fixed gear 222, which is formed in a substantially disc-like shape.

The fixed gear 222 is fixed to a cushion frame 13 of a seat cushion, with the plates 226, 228 interposed therebetween, and the center thereof is coincident with the rotational center S of the seatback 12. Further, the plate 226 is fixed to a cushion frame 232(13), and the plate 228 is fixed to a frame 230(231) of the seatback 12. Accordingly, when the seatback 12 is rotated about the rotational center S, the fixed gear 222 and the plate 226 do not rotate, but the plate 228 rotates integrally with the seatback 12 about the rotational center S.

The gear 224 of the fixed gear 222 is formed only at a portion along the circumferential direction (in the present direction, approximately half the circumference). A portion of the outer periphery of the fixed gear 222 at which the gear 224 is not formed is a sliding surface 230 having a fixed radius from the center of the fixed gear 222.

On the other hand, as shown in FIG. 4, among the plurality of teeth structuring the pinion 220 of the revolving gear 216, the length (tooth dimension) in the axial direction of one tooth 232 is shorter, and in actuality, between teeth 234, 236 at both sides thereof, a notched tooth portion 238 is formed. Namely, the relative positional relationship of the fixed gear 222 and the revolving gear 216 is determined such that in a state in which a portion other than the notched tooth portion 238 among the pinion 220 meshes with the gear 224, the revolving gear 216 revolves about the fixed gear 222 while rotating (see FIG. 5B), but when the notched tooth portion 238 faces the fixed gear 222, the teeth 234, 236 at both sides of the notched tooth portion 238 directly contact (see FIG. 7B) the sliding surface 230 due to the notched portion 238. In this state, even if the revolving gear 216 revolves about the periphery of the fixed gear 222, the revolving gear 216 itself does not rotate since the teeth 234, 236 contact the sliding surface 230 and slide, and the notched tooth portion 238 is maintained in a state (see FIG. 5B) in which the notched tooth portion 238 constantly faces the rotational center S (see FIG. 3) of the seatback 12.

At the plate 228, a holder receiving hole 240 is formed. At the holder receiving hole 240, a large diameter portion 244 of a holder 242 is received. The holder 242, integrally with a holder portion 248 of a gear cover 246, structures a receiving portion 250 for receiving the rotating tube body 212. The gear cover 246 is formed in a substantially flat cylindrical form, and is attached to the plate 228 integrally with the holder 242 by a bolt 247, and can revolve about the rotational center S. Within this gear cover 246, the revolving gear 216 is accommodated.

Further, the holder portion 248 is formed at the gear cover 246, and in a state in which the holder 242 is fixed by the bolt 247, the receiving portion 250, which rotatably accommodates the rotating tube body 212, is structured by the holder portion 248 and the holder 242. As a result, when the seatback 12 rotates, the rotating tube body 212 revolves about the rotational center S while maintaining a state in which the bevel gear 214 is meshed with the bevel gear 218 of the revolving gear 216.

Accordingly, when the seat back 12 is rotated about the rotational center S, within a range in which the bevel gear 220 of the revolving gear 216 is meshed with the gear 224 of the fixed gear 222, the revolving gear 216 itself rotates, while revolving about the rotational center S. As a result, the wire 152 also rotates via the rotating tube body 212. Since the rotating tube body 142 at the upper end of the wire 152 also rotates, the face wheel 130 rotates about the axial line J, and the bracket 40 rotates about the axial line J.

At this time, the rotational direction of the bracket 40 is the opposite direction to the rotational direction of the seatback 12, and the shapes, number of teeth, and the like of the fixed gear 222, the revolving gear 216, the rotational tube bodies 212, 142, the wheel gear 200 and the face wheel 130 are determined so as to make the rotational angle of the bracket 40 equal to the rotational angle of the seatback 12. Accordingly, the bracket 40 is constantly maintained at a predetermined angle (in the present embodiment, horizontal) with respect to the horizontal plane, regardless of the rotational angle of the seatback 12.

Figure 5B:
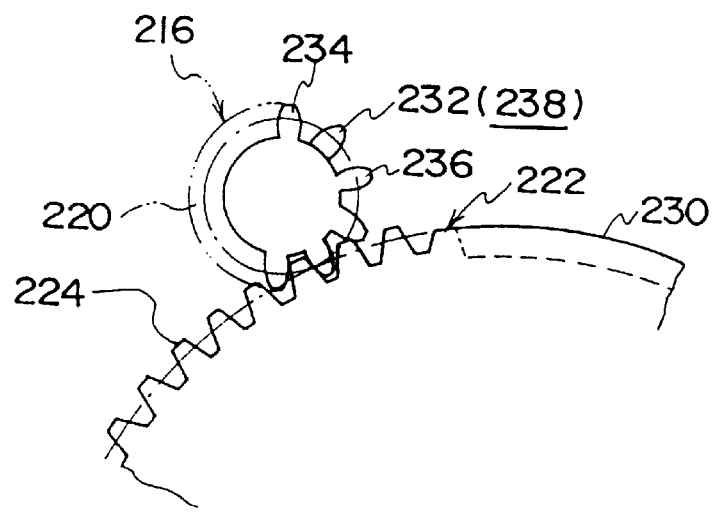
FIG. 5B is a side view schematically showing meshing of a fixed gear and the revolving gear when the seat for an automobile is at the predetermined reclining angle.

When the angle at which the seatback 12 is collapsed forward becomes a predetermined angle (an angle at which there is no possibility of a passenger being seated in the seat, see FIG. 5B) and the revolving gear 216 reaches a position corresponding to the sliding surface 230, the teeth 234, 236 at both sides of the notched tooth portion 238 contact the sliding surface 230, and even if the seatback 12 is collapsed forward further, the revolving gear 216 itself stops rotating, and therefore, the rotating tube body 212 and the wire 152 also do not rotate. As a result, the face wheel 130 and the bracket 40 do not rotate about the axial line J, and the bracket 40 is held at a fixed position relative to the frame plate 16.

Thereafter, when the inclining member is moved in a direction of being returned to an original state, interlock prevention, in which interlock of angle maintaining means (the revolving gear 216) with respect to the inclining member (the seatback 12) is prevented by interlock prevention means (the sliding surface 230), is released. As a result, within a range of the predetermined angle of inclination, the supporting body can be maintained at a predetermined angle with respect to the horizontal plane by the angle maintaining means. Further, in a state in which the inclining member 12 is inclined beyond a predetermined angle of inclination, the interlock prevention means 230 fixedly maintains a relative position of the angle maintaining means 216 with respect to the inclining member 12. Accordingly, when the interlock prevention by the angle maintaining means 216 is released, a phase difference is not generated between the angle maintaining means 216 and the inclining member 12. As a result, deviation is not generated in the angle of the supporting b body 40 with respect to the inclining member 12, and the supporting body 40 is maintained at a fixed angle with respect to the horizontal plane by the angle maintaining means 216.

To be more specific, when the meshing between the fixed gear body and the revolving gear body is released by the meshing release portion 230, the fixing portion fixes the revolving gear body such that the revolving gear body is unable to undergo relative rotation with respect to the inclining member. As a result, the revolving gear body is maintained at a fixed position relative to the inclining member, and the supporting body is maintained at a fixed position with respect to the inclining member as well. When the revolving gear returns to a position in which it meshes with the f fixed gear body, a phase difference is not generated between the revolving gear body and the fixed gear body. Deviation in the angle of the supporting body with respect to the inclining member does not occur, and the supporting body is maintained at a fixed angle with respect to the horizontal plane.

Next, operation and movements of the acceleration sensor 10 according to the present embodiment will be explained.

When the seatback 12 to which the retractor 14 is attached is in a state shown by actual lines in FIG. 5A (inclining at a predetermined reclining angle with respect to the vertical line G), the bracket 40 is urged to rotate such that the center line C of the bracket 40 becomes the same direction as the vertical line G, by rotating force due to the weight of the weight 118. Further, the control protrusion 136 is left-right symmetrical with respect to the vertical line G in a side view, and the control shaft 138 of the bracket 40 is positioned at the center of the pair of side walls 136A of the control protrusion 136. As a result, the control shaft 138 does not resist rotational force caused by weight of the weight 118, become pressed onto the side walls 136 A of the control protrusion 136, and rotate. Thus, the center line C of the bracket 40 coincides with the vertical line G.

And in an ordinary state, as shown in FIG. 8, the sensor ball 48 is positioned at the center of supporting surface 46, and does not push the holding plate 62 upward (direction away from the supporting surface 46). Since the sensor lever 56 does not rotate, the pawl 66 also does not rotate in the counter-clockwise direction (direction of arrow B) in FIG. 8. As a result, the latching pawl 80 of the pawl 66 does not engage with the ratchet teeth 24, and the unillustrated spool can rotate in either of the directions of the webbing 20 take-up direction (direction of arrow A in FIG. 3) and pull-out direction (direction opposite to arrow A).

When acceleration in the horizontal direction operates on the acceleration sensor 10, the sensor ball 48 is inertially moved and rolls upward on the supporting surface 46. However, in a case in which the acceleration is of a magnitude of a predetermined value or less, as the rotational angle of the sensor lever 56 and the pawl 66 is minute, the latching pawl 80 of the pawl 66 does not engage with the ratchet teeth 24.

In a case in which the magnitude of acceleration is a predetermined value or more, the sensor ball 48, which is inertially moved on the supporting surface 46, reaches an upper portion of the supporting surface 26, and pushes the holding plate 62 upward, as shown in FIG. 9. The sensor lever 56 rotates, and the control protrusion 64 pushes a receiving surface 78 of the pawl 66 upward. Accordingly, the pawl 66 rotates in the counter-clockwise direction in FIG. 9 (direction of arrow B). As a result, the latching pawl 80 engages with the ratchet teeth 24, and rotation of the spool in the webbing 20 pull-out direction is prevented.

Further, in this state, when the vehicle body inclines in the pitching direction, the bracket 40 rotates about the axial line J due to the weight of the weight 118, and attempts to rotate in the direction in which the center line C of the bracket 40 coincides with the vertical line G, but in this regard, the face wheel 130 rotates with the vehicle body about the axial line J. As a result, one of predetermined clearances formed between the side walls 136A of the control protrusion 136 and the control shaft 138 is eliminated (the other clearance widens), and thus, the control shaft 138 is pressed against the side wall 136A of the control protrusion 136, and the bracket 40 inclines with respect to the vehicle body. As a result, the sensor ball 48 moves on the supporting surface 46, and pushes the holding plate 62 upward. The sensor lever 56 and the pawl 66 rotate, and the latching pawl 80 engages with the ratchet teeth 24.

In this way, the control shaft 138 is pressed on the side wall 136A of the control protrusion 136, and together with the vehicle body the bracket 40 inclines. Therefore, even with a small angle of inclination, rotation of the spool in the webbing 20 pull-out direction can be reliably locked. Namely, compared with a sensor device of an automatic follow-up system, so-called static lock angle is reduced.

Figure 6A:
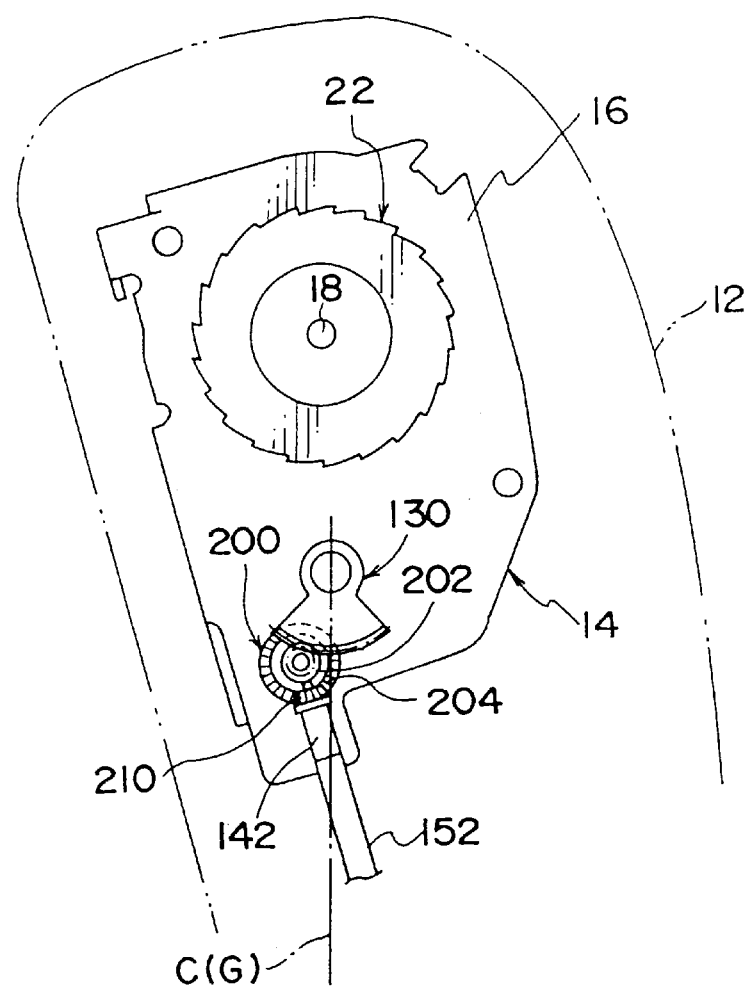
FIG. 6A is a side view schematically showing the retractor having the acceleration sensor relating to the first embodiment of the present invention attached thereto when the seat for an automobile is rotated from the state shown in FIG. 5A towards the front of the vehicle.
Figure 6B:
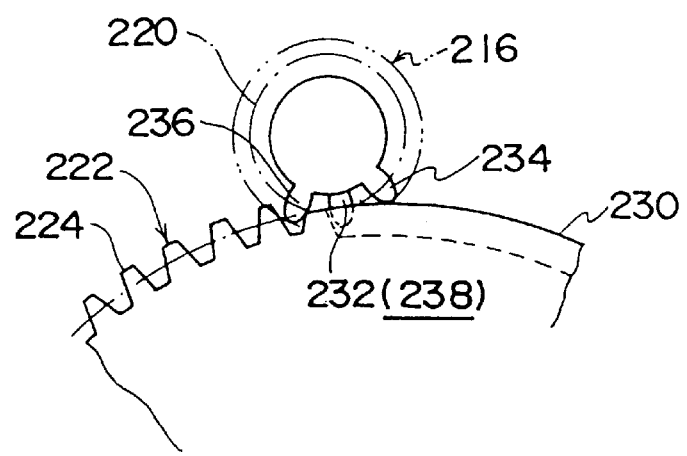
FIG. 6B is a side view schematically showing meshing of the fixed gear and the revolving gear when the seat for an automobile is rotated from the state shown in FIG. 5B towards the front of the vehicle.

In a state in which acceleration of a predetermined value or more is not operating on the vehicle, if the seatback 12 is rotated and gradually collapsed forward, with the forward-collapsed angle being in a range of a predetermined angle, as shown in FIG. 6B, the gear of the fixed gear 222 and the pinion 220 of the revolving gear 216 mesh, the wire 152 thereby rotates, and the wheel gear 200 and the face wheel 130 also rotate. As a result, the bracket 40 rotates (however, when considering the bracket 40 itself, the bracket 40 does not rotate with respect to the vertical line G, and the center line C coincides with the vertical line G) with respect to the seatback 12 due to weight of the weight 118, and the center line C of the bracket 40 is held in the vertical direction.

Here, for example, due to twisting of the wire 152, loose attachment of the face wheel 130, and the like, deviation may occur between the angle of inclination of the seatback 12 and the rotational angle of the bracket 40. However, in this case as well, since predetermined clearances are formed between the side walls 136A of the control protrusion 136 and the control shaft 138, rotation of the face wheel 130 alone is allowed by eliminating one of these clearances. Namely, due to these clearances, the bracket 40 rotates within a fixed range independently from the face wheel 130 by weight of the weight 118, and the deviation produced between the angle of inclination of the seatback 12 and the rotational angle of the bracket 40 is corrected. As a result, the center line C of the bracket 40 constantly coincides with the vertical line G.

Further, swinging of the bracket 40 (swinging in a pendulum form about the axial line J due to weight of the weight 118) immediately after the seatback 12 inclines is controlled by the control shaft 138 abutting the side wall 136A of the control protrusion 136.

In this state, when acceleration of the bracket 40 of a predetermined value or more operates, as shown in FIG. 9, the sensor ball 48 is inertially moved on the supporting surface 46, reaches the upper portion of the supporting surface 46, and pushes the holding plate 62 upward. Since the sensor lever 56 and the pawl 66 rotate and the latching pawl 80 engages with the ratchet teeth 24, the spool is prevented from rotating in the webbing 20 pull-out direction (direction of arrow A in FIG. 3).

Further, in a case in which the vehicle body rotates in the pitching direction, one of the clearance formed between the control shaft 138 and the side walls 136A of the control protrusion 136 is eliminated, and the control shaft 138 is pushed against the side wall 136A of the control protrusion 136, and the weight 118 inclines with respect to the vehicle body. The sensor ball 48 moves on the supporting surface 46, and pushes the supporting plate 62 upward. As a result, the sensor lever 56 and the pawl 66 rotate, and the latching pawl 80 is engaged with the ratchet teeth 24.

As shown in FIG. 7A, in a state in which the forward-collapsed angle of the seatback 12 exceeds the predetermined angle, the control pin 146 of the bracket 40 abuts the end portion of the control hole 144 of the hanger 92, and rotation of the bracket 40 with respect to the seatback 12 is prevented. Further, as shown in FIG. 7B, the revolving gear 216 arrives at a position corresponding to the sliding surface 230, and the revolving gear 216 itself no longer rotates, even if the seatback 12 is rotated. Needless to say, rotation prevention of the bracket 40 with respect to the seatback 12, which depends on the control hole 144, is structured to supplement the rotation prevention effect on the revolving gear 216 by the sliding surface 230. Thus, the rotating tube body 212 and the wire 152 do not rotate, and the face wheel 130 and the bracket 40 also do not rotate about the axial line J. Accordingly, as can be seen from FIG. 7A as well, the bracket 40 is reliably held at a fixed position relative to the frame plate 16.

In this way, since in a state in which there is no possibility of a passenger being seated in the seat, the bracket 40 does not rotate about the axial line J with respect to the frame plates 16, a space to be formed at the frame plates 16 in consideration of this rotation can be reduced. Thus, space efficiency increases, and the frame plates 16 themselves, namely, the retractor 14, can be made compact. Further, accommodation space for the retractor 14 within the seatback 12 can be reduced as well.

Further, in a state in which the forward-collapsed angle of the seatback 12 exceeds a predetermined angle, as for the revolving gear 216, the notched tooth portion 238 constantly faces the rotational center S of the seatback 12, and the rotating tube body 212, the wire 152, the rotating tube body 142, and the wheel gear 200 are maintained in a fixed direction (rotation position) without rotating.

As a result, when the seatback 12 is tilted rearward and the pinion 220 of the revolving gear 216 begins to mesh with the gear 224 of the fixed gear 222, deviation does not occur in the position (rotational angle) of the rotating tube body 212, the wire 152, the rotating tube body 142, and the wheel gear 200 with respect to the angle of inclination of the seatback 12. Accordingly, as the seatback 12 is tilted rearward further, the face wheel 130 is constantly left-right symmetrical with respect to the vertical line G, and the center line C of the supporting surface 46 of the bracket 40 coincides with the vertical line G.

In FIG. 10, a fixed gear 252, a revolving gear 260, and a rotating tube body 270 (rotating tube body of a lower end of the wire 152) of an acceleration sensor according to a second embodiment of the present invention are shown. The acceleration sensor according to the second embodiment of the present invention differs from the acceleration sensor 10 according to the first embodiment only in structures of the fixed gear 252, the revolving gear 260, and the rotating tube body 270, and since other members are all the same, description thereof is omitted.

The revolving gear 260 of the acceleration sensor according to the second embodiment is held so as to be able to revolve about the rotational center S (see FIG. 3) while maintaining a state in which the center line C1 of the revolving gear 260 is parallel with the rotational center S of the seatback 12, due to an unillustrated plate (substantially the same as the plate 228 according to the first embodiment). At a bevel gear 262 of the revolving gear 260, a bevel gear 272 of the rotating tube body 270 is meshed, and when the revolving gear 260 rotates, the rotating tube body 270 also rotates. At the rotating tube body 270, in the same way as in the first embodiment, a bottom end of the wire 152 is fixed.

At a pinion 264 of the revolving gear 260, a portion corresponding to the notched tooth portion 238 according to the first embodiment is not formed, and teeth are formed over the entire periphery. In this regard, a gear 254 of the fixed gear 252 is formed in a portion in the circumferential direction of the fixed gear 252, and a portion at which the gear 254 is not formed is a notched tooth portion 256 which does not mesh with the pinion 264.

Further, at the fixed gear 252, at a position corresponding to the notched tooth portion 256, a sliding surface 258 having a fixed radius from the rotational center S is formed. Then, correspondingly to the sliding surface 258, a contacting surface 268 that can surface-contact the sliding surface 256 is formed at a shaft portion 266 of the revolving gear 260.

In the acceleration sensor according to the second embodiment having this kind of structure, in a state in which the pinion 264 of the revolving gear 260 meshes with the gear 254 of the fixed gear 252, the revolving gear 260 rotates while revolving about the rotational center S, but when the pinion 264 reaches the notched tooth portion 256, the contacting surface 268 surface-contacts the sliding surface 258. As a result, the contacting surface 268 constantly faces the rotational center S, and even if the seatback 12 rotates, the revolving gear 260 does not rotate. Further, the control pin 146 of the bracket 40 abuts the end portion of the control hole 144 of the hanger 92, and rotation of the bracket 40 with respect to the seatback 12 is prevented.

Accordingly, in the acceleration sensor according to the second embodiment as well, when the forward-collapsed angle of the seatback 12 exceeds a predetermined angle (see FIG. 7A), the bracket 40 is held at a fixed position relative to the frame plate 16. Therefore, a predetermined space does not need to be formed in the frame plates 16 in consideration of the rotation of the bracket 40. Accordingly, together with increased space efficiency, the frame plates 16 themselves, namely, the retractor 14, can be made compact. Further, the accommodation space of the retractor 14 within the seatback 12 can be reduced.

Further, in a state in which the forward-collapsed angle of the seatback 12 exceeds the predetermined angle, the contacting surface 268 of the revolving gear 260 faces the rotational center S of the seatback 12, and since the positions (rotational angles) of the rotating tube body 270, the wire 152, the rotating tube body 152, and the wheel gear 200 are fixedly maintained, when the seatback 12 is tilted rearward, deviation does not occur in the positions (rotational angles) of the rotating tube body 270, the wire 152, the rotating tube body 152, and the wheel gear 200 with respect to the angle of inclination of the seatback 12. As a result, the center line C of the supporting surface 46 of the bracket 40 coincides with the vertical line G.

In FIG. 11, a fixed gear 282 and a rotating tube body 290 of an acceleration sensor according to a third embodiment of the present invention are shown.

The fixed gear 282 differs from the fixed gear 222 according to the first embodiment, in that the gear 284 is a bevel gear. Further, the sliding surface 286, corresponding to the bevel gear, is formed in an umbrella-like shape (conical shape).

A bevel gear 292 of the rotating tube body 290 is structured so as to mesh with the gear 284 of the fixed gear 282 directly. Further, a notched tooth portion 288 is formed at the bevel gear 292.

Accordingly, in the acceleration sensor according to the third embodiment, in the same way as in the acceleration sensor 10 according to the first embodiment, when the forward-collapsed angle of the seatback 12 exceeds a predetermined angle, even if the seatback 12 is collapsed forward still further, the rotating tube body 290 itself no longer rotates, and the face wheel 130 and the bracket 40 also no longer rotate about the axial line J. As a result, the space formed in the frame plates 16 in consideration of rotation of the bracket 40 is reduced, and space efficiency improves.

Further, in comparison with the acceleration sensor 10 of the first embodiment and the acceleration sensor of the second embodiment, since the rotating gear 216, 260 are unnecessary, the number of components are reduced.

Further, when the forward-collapsed angle of the seatback 12 exceeds the predetermined angle, since the notched tooth portion 238 of the rotating tube body 290 constantly faces the rotational center S of the seatback 12 and the positions (rotational angles) of the rotating tube body 290, the wire 152, the rotating tube body 142, and the wheel gear 200 are fixedly maintained with respect to the seatback 12, deviation in the rotational amount of when the seatback 12 is tilted rearward and the teeth of the bevel gear 292 mesh with the teeth of the gear 284 and rotate is absorbed. As a result, the face wheel 130 is constantly left-right symmetrical with respect to the vertical line G, and the center line C of the supporting surface 46 of the bracket 40 coincides with the vertical line G.

Figure 12:
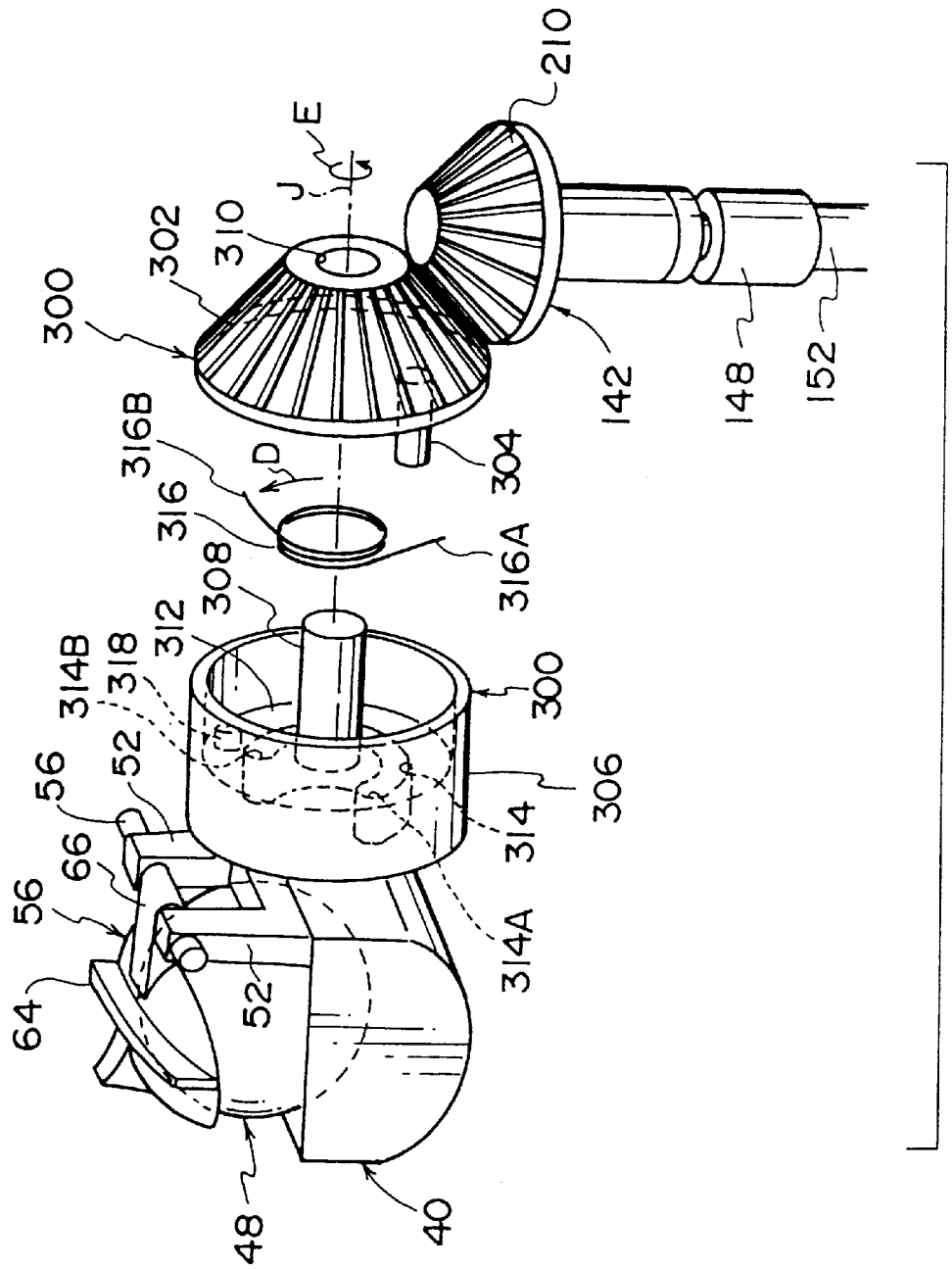
FIG. 12 is an exploded perspective view of a vicinity of a bracket of an acceleration sensor relating to a fourth embodiment of the present invention.

In FIG. 12, a portion in a vicinity of the bracket 40 of an acceleration sensor according to a fourth embodiment of the present invention is shown. With the acceleration sensor according to the fourth embodiment, a rotational force transmitting structure from the rotating tube body 142 at the upper end of the wire 152 to the bracket 40 differs from the acceleration sensor 10 according to the first embodiment. Further, the sliding surface 230 is not formed in the fixed gear 222 (see FIG. 3), and the notched tooth portion 238 is not formed in the revolving gear 216 (see FIG. 3) either. Accordingly, the pinion 220 of the revolving gear 216 constantly meshes with the gear 224 of the fixed gear 222 and rotates, and the wire 152 also rotates, regardless of the rotational angle of the seatback 12.

Further, in the acceleration sensor of the fourth embodiment, instead of the wheel gear 200 according to the first embodiment, a substantially conical wheel gear 300 in which only a bevel gear 302 is formed (namely, a gear corresponding to the pinion 202 of the wheel gear 200 is not formed) is provided so as to be able to rotate about the axial line J. A rotation pin 304 is provided so as to protrude from the wheel gear 300 towards the bracket 40, in parallel with the axial line J.

On the other hand, at the bracket 40, a rotating tube body 306 is fixed coaxially with the axial line J. The rotating tube body 306 is formed in a cylindrical shape with a bottom, in which a side facing the wheel gear 300 is open. Further, a rotational shaft 308 is provided erect at the center of the rotating tube body 306. This rotational shaft 308 is inserted into a shaft hole 310 formed at the center of the wheel gear 300.

An arc-shaped long aperture 314 having the axial line J as the center is formed in a bottom plate 312 of the rotating tube body 306, and the rotation pin 304 is received in this long aperture 314. Accordingly, relative rotation of the wheel gear 300 and the rotating tube body 306 is controlled to a fixed range by the rotation pin 304 abutting one end 314A or the other end 314B of the long aperture 314.

A torsion coil spring 316 is disposed by being twisted about the rotational shaft 308, between the bottom plate 312 of the rotating tube body 306 and the wheel gear 300. As for the torsion coil spring 316, one end 316 thereof contacts the rotation pin 304, and the other end 316B contacts a contact pin 318 provided erect from the bottom plate 312. The torsion coil spring 316 urges the rotating tube body 306 in the direction of arrow D, with respect to the wheel gear 300. Due to this urging force, the rotation pin 304 is ordinarily positioned at the one end 314A of the long aperture 314.

Further, the holder 162 and the holder cover 164 are formed in predetermined forms so as to correspond to the forms of the abovedescribed wheel gear 300 and the rotating tube body 306 and be able to accommodate them.

With the acceleration sensor according to the fourth embodiment of the present invention, when the forward-collapsed angle of the seatback 12 is in the range of the predetermined angle, the wire 152 rotates in correspondence with the rotational angle of the seatback 12, and the wheel gear 300 also rotates in the direction of arrow E in FIG. 12. Due to this rotation, the rotation pin 304 attempts to move from one end towards the other within the long aperture 314, but due to the urging force of the torsion coil spring 316, the rotating tube body 306 is also urged to rotate in the direction of arrow E about the axial line J. As a result, the bracket 40 also rotates about the axial line J, due to the gravitational mass of the weight 118, and the supporting surface 46 is maintained at a predetermined angle.

When the forward-collapsed angle of the seatback 12 exceeds a predetermined angle, rotation of the bracket 40 is controlled by the control pin 146 abutting the control hole 144 (see FIG. 2). If the seatback 12 is collapsed forward further from this state, the bracket 40 and the rotating tube body 306 do not rotate with respect to the seatback 12, and are maintained at a fixed position. However, since the wire 152 rotates further, the rotation pin 304 resists urging force of the torsion coil spring 316 to move towards the other end 314B within the long aperture 314, and the wheel gear 300 rotates as well.

In this way, when the forward-collapsed angle of the seatback 12 exceeds the predetermined angle, even if the seatback 12 is collapsed forward further, the bracket 40 no longer rotates about the axial line J. As a result, the space formed at the frame plates 16 in consideration of rotation of the bracket 40 can be reduced, and thus space efficiency is improved.

When the seatback 12 is tilted backward from a forward-collapsed state, the wheel gear 300 rotates in the direction opposite the arrow E, and the rotation pin 304 moves toward the one end 314A within the long aperture 314. In this way, due to the rotation pin 304 moving within the long aperture 314, the rotational difference (phase difference) between the wheel gear 300 and the rotating tube body 306, the bracket 40 is absorbed.

When the supporting surface 46 of the bracket 40 becomes horizontal, the rotation pin 304 abuts against the one end 314A within the long aperture 314. Thereafter, pushed by the rotation pin 304, the rotating tube body 306 and the bracket rotate about the axial line J, and the supporting surface 46 is maintained horizontally.

As described above, in any of the acceleration sensors according to the embodiments, in a state in which the forward-collapsed angle of the seatback 12 is a predetermined value or more, the bracket 40 no longer rotates about the axial line J with respect to the frame plate 16. Accordingly, it is no longer necessary to provide a space at the frame plate 16 in consideration of this rotation, and space efficiency is thus raised.

Further, when the forward-collapsed angle of the seatback 12 becomes a predetermined angle or more and the bracket 40 does not rotate about the axial line J with respect to the frame plate 16, deviation (phase difference) between the rotational angle of the seatback 12 and the angle of the bracket 40 with respect to the frame plate 16 is absorbed. As a result, when the seatback 12 is tilted rearward from the forward collapsed state, the angle of the bracket 40 with respect to the frame plate 16 becomes fixed, and the supporting surface 46 of the bracket 10 is constantly maintained horizontally.

Further, the interlock prevention means of the present invention does not necessarily have to be provided at the above-described position (vicinity of the upper end or vicinity of the lower end of the wire 152), and need only be provided in an interval of the rotational force transmitting system of from the fixed gear 22 to the bracket 40. For example, the wire 152 may be segmented midway, and this segmented portion may be connected by the interlock prevention means.

Further, in the above description, a case was given as an example in which the acceleration sensor 10 is attached to the retractor 14 and this retractor 14 is disposed in the seatback 12. However, needless to say, the position or member in which the acceleration sensor 10 is to be used is not limited as such.

What is claimed is:

1. An acceleration sensor, comprising:
    a supporting body attached to an inclinable inclining member so as to be rotatable at least about an axis parallel with an inclination center of the inclining member;
    a moving body supported at the supporting body, for driving an output member by being inertially moved by an acceleration of a predetermined value or more;
    angle maintaining means for interlocking with inclination of the inclining member to maintain the supporting body at a fixed angle with respect to the horizontal plane; and
    interlock prevention means for, when the inclining member inclines exceeding a predetermined angle of inclination, preventing interlock of the angle maintaining means with respect to the inclining member and fixedly maintaining a relative position of the angle maintaining means with respect to the inclining member.

2. The acceleration sensor according to claim 1, wherein the acceleration is detected due to the moving body being inertially moved by the acceleration of the predetermined value or more to drive the output member.

3. The acceleration sensor according to claim 2, wherein the angle maintaining means comprises:
    a fixed gear body fixed coaxially with the inclination center of the inclining member; and
    a revolving gear body attached to the inclining member so as to be able to revolve with respect to the fixed gear body to thereby mesh with the fixed gear body, and
    the interlock prevention means comprises:
    a releasing portion for releasing meshing of the fixed gear body and the revolving gear body when the inclining member inclines exceeding a predetermined angle of inclination; and
    a fixing portion for, when the meshing of the fixed gear body and the revolving gear body is released, fixing the revolving gear body such that relative rotation thereof with respect to the inclining member is impossible.

4. The acceleration sensor according to claim 3, wherein the angle maintaining means includes a weight fixedly mounted to the supporting body.

5. The acceleration sensor according to claim 4, wherein the angle maintaining means includes means for interlocking to rotate the supporting body in the opposite direction to a rotational direction of the inclining member so as to make the rotational angle of the supporting body equal to a rotational angle of the inclining member.

6. The acceleration sensor according to claim 5, wherein the releasing portion of the interlock prevention means is a notched tooth portion provided at the revolving gear body.

7. The acceleration sensor according to claim 2, wherein the angle maintaining means comprises:
- a rotating body fixed at the supporting body so as to be rotatable about the rotational axis of the supporting body; and
- rotating means for interlocking with inclination of the inclining member so as to be able to rotate the rotating body in the opposite direction to the inclination direction of the inclining member and at the same angle as the inclination of the inclining member, and the interlock prevention means comprises:
- means for abutting the supporting body when the inclining member inclines exceeding a predetermined angle, to prevent relative rotation of the supporting body with respect to the inclining member; and
- allowing means for allowing the rotating means to rotate relatively to the rotating body, in a state in which the interlock prevention means has prevented relative rotation of the supporting body with respect to the inclining member.

8. The acceleration sensor according to claim 5, wherein the releasing portion of the interlock prevention means is a notched tooth portion provided at the fixed gear body.

9. The acceleration sensor according to claim 5, wherein the fixing portion of the interlock prevention means is a sliding surface provided at the fixed gear body.

10. The acceleration sensor according to claim 2, wherein the angle maintaining means comprises
- a fixed gear body fixed coaxially with the inclination center of the inclining member, and
- a gear structure for rotating the supporting body, the gear structure being meshed with the fixed gear body and thereby rotating the supporting body about the rotational axis thereof when the fixed gear body is rotated, and the interlock prevention means comprises
- a releasing portion for releasing meshing of the fixed gear body and the gear structure when the inclining member inclines exceeding a predetermined angle of inclination, and
- a fixing portion for, when the meshing of the fixed gear body and the gear structure is released, fixing the gear structure such that relative rotation thereof with respect to the inclining member is impossible.

11. The acceleration sensor according to claim 10, wherein the releasing portion of the interlock prevention means is a notched tooth portion provided at the gear structure.

12. The acceleration sensor according to claim 10, wherein the fixing portion of the interlock prevention means is a sliding surface provided at the fixed gear body.

13. The acceleration sensor according to claim 5, wherein the angle maintaining means further includes a face wheel which moves by interlocking with the revolving gear body and the face wheel includes a control protrusion having a pair of side walls, and when the inclining member inclines within a range of a predetermined angle of inclination, the control protrusion is constantly maintained at a predetermined angle with respect to the horizontal plane.

14. The acceleration sensor according to claim 13, wherein when the inclining member inclines within a range of a predetermined angle of inclination, a control shaft of the supporting body and a rotational shaft of the supporting body are reliably maintained on a single vertical line passing between the pair of side walls.

15. The acceleration sensor according to claim 13, wherein when a vehicle itself inclines in a pitching direction, the face wheel rotates about the rotational axis of the supporting body together with a vehicle body, and as a result, a control protrusion, the supporting body is pressed by one of the side walls of the control protrusion, the supporting body inclines with respect to the vehicle body, and the output member is driven.

16. The acceleration sensor according to claim 14, wherein a predetermined clearance is provided between each of the side walls of the control protrusion and the control shaft.

17. The acceleration sensor according to claim 16, wherein the clearance is formed such that the supporting body is able to rotate within a fixed range independently of the face wheel, by weight of the weight.

18. An acceleration sensor, comprising:
- a supporting body attached to an inclinable inclining member so as to be rotatable at least about an axis parallel with an inclination center of the inclining member;
- a moving body supported at the supporting body, for driving an output member by being inertially moved by an acceleration of a predetermined value or more;
- angle maintaining means for interlocking with inclination of the inclining member to maintain the supporting body at a fixed angle with respect to the horizontal plane; and
- interlock prevention means for, when the inclining member inclines exceeding a predetermined angle of inclination, preventing interlock of the angle maintaining means with respect to the inclining member and fixedly maintaining a relative position of the angle maintaining means with respect to the inclining member, wherein the interlock prevention means comprises:
- means for abutting the supporting body when the inclining member inclines exceeding a predetermined angle, to prevent relative rotation of the supporting body with respect to the inclining member; and
- allowing means for allowing the rotating means to rotate relatively to the rotating body, in a state in which the interlock prevention means has prevented relative rotation of the supporting body with respect to the inclining member.

19. The acceleration sensor according to claim 18, wherein the acceleration is detected due to the moving body being inertially moved by the acceleration of the predetermined value or more to drive the output member.

* * * * *

UNITED STATES PATENT AND TRADEMARK OFFICE
CERTIFICATE OF CORRECTION

PATENT NO.   : 6,470,746 B1
DATED        : October 29, 2002
INVENTOR(S)  : Yasunori Murayama et al.

It is certified that error appears in the above-identified patent and that said Letters Patent is hereby corrected as shown below:

<u>Title page,</u>
Item [73], Assignee, to read as follows:
-- Kabushiki Kaisha Tokai-Rika-Denki-Seisakusho --

Signed and Sealed this

Eighteenth Day of March, 2003

JAMES E. ROGAN
*Director of the United States Patent and Trademark Office*